April 10, 1934.  R. B. SMITH  1,954,579
ELECTRIC LAWN MOWER
Filed Oct. 3, 1930    2 Sheets-Sheet 1

INVENTOR
Robert Bigham Smith,
BY
Warren S. Orton
ATTORNEY

April 10, 1934.    R. B. SMITH    1,954,579
ELECTRIC LAWN MOWER
Filed Oct. 3, 1930    2 Sheets-Sheet 2

INVENTOR
Robert Bigham Smith,
BY
Warren S. Orton.
ATTORNEY

Patented Apr. 10, 1934

1,954,579

UNITED STATES PATENT OFFICE 1,954,579

ELECTRIC LAWN MOWER

Robert Bigham Smith, Macon, Ga.

Application October 3, 1930, Serial No. 486,118

4 Claims. (Cl. 56—25)

The invention relates to a lawn mower of the type in which a motor driven cutting tool revolves at high speed in a horizontal plane about a vertical axis in effecting a severing of the grass in circular swaths.

The primary object of the invention is to provide a simplified, easily and thus cheaply manufactured form of lawn mower in which structural parts have been reduced in number, size and weight of material and to assemble these necessary structural parts so as to provide an internally braced and rugged form of lawn mower.

Still featuring the desire for simplicity of construction, the disclosure features a simplified means for varying the vertically adjusted position of the cutting blade to thus vary the distance above the ground at which the grass is severed while maintaining a short rugged driving connection with the motor or other prime mover carried by the device and the weight of which motor is utilized to provide pressure on the roller usually found in devices of this character.

Still another object of the invention is to provide a simplified form of cutting tool which can be readily manufactured in one piece as a stamping proposition and with the cutting teeth disposed to give a highly efficient character of grass cutting capacity and also designed so as to be readily sharpened both at the time of construction of the tool as well as during subsequent resharpening of the tool.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

Figure 1:
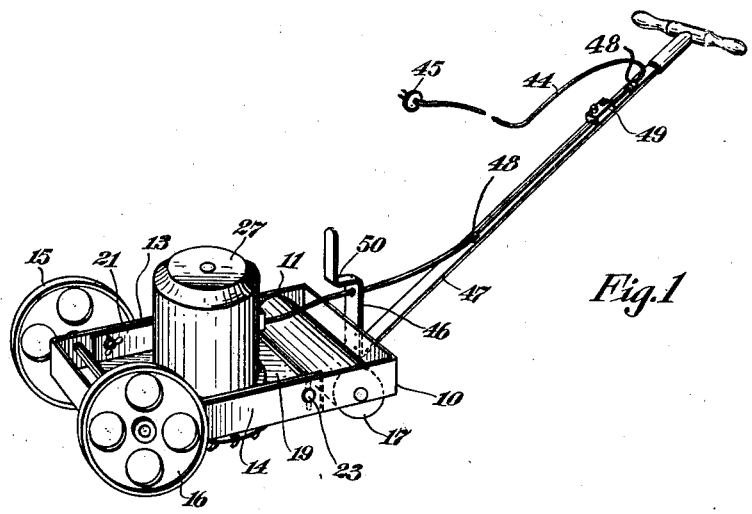
Fig. 1 is a view in perspective of a lawn mower constituting a preferred embodiment of the invention.
Figure 2:
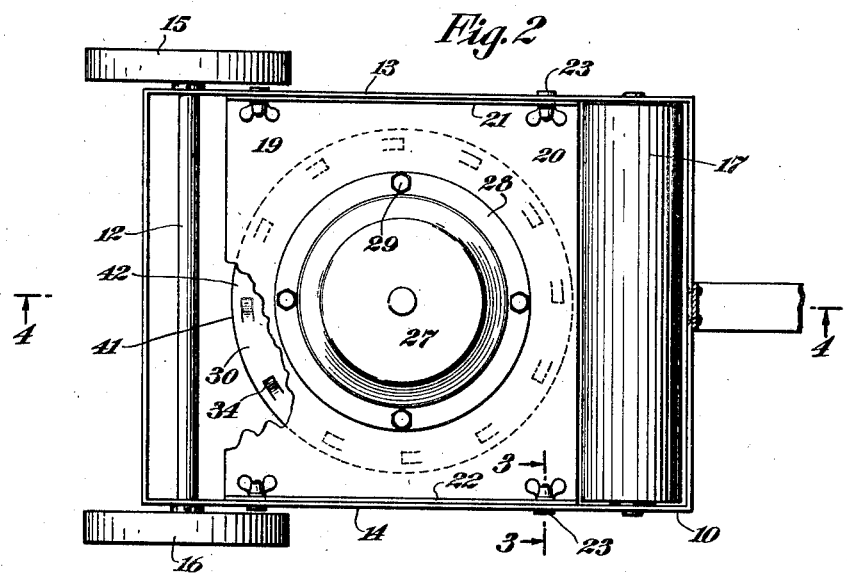
Fig. 2 is an enlarged plan view looking down upon the showing in Fig. 1 and with parts broken away.
Figure 3:
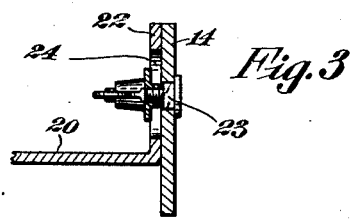
Fig. 3 is a detailed view showing the connection between the carriage and the motor supporting platform and taken on the line 3—3 of Fig. 2.

Referring to the showing in Fig. 1, there is disclosed a wheel supported carriage 10 including a rectangular frame 11 open at top and bottom and formed preferably of a length of sheet metal bent to form and with its ends secured together conventionally as by welding. An axle 12 extends through opposing sides 13 and 14 of the frame and is supported at opposite ends by ground engaging wheels 15 and 16. Fitted between the sides 13 and 14 at the opposite or handle end of the frame is a pressure roller 17 mounted for free rotary movement on a shaft 18 opposite ends of which are secured to the sides 13 and 14. A motor platform 19 is fitted between the sides 13 and 14 of the carriage frame 13 and includes a flat horizontally extending portion 20 with upturned flanges 21 and 22 engaging respectively in abutting relation with the sides 13 and 14. This platform extends as shown in Fig. 2 from the roller 17 substantially to the axle 12 and constitutes a filler for rigidly bracing the carriage frame against distorting action.

Figure 7:
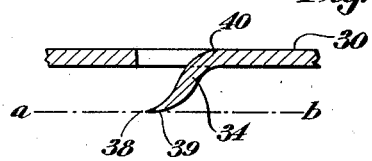
Fig. 7 is a vertical sectional view through one of the cutter teeth and taken on the line 7—7 of Fig. 5.

The present disclosure features the vertical adjustment of the cutting tool hereinafter described and to provide for this adjustment the motor platform is secured in vertically adjusted position by means of wing nuts 23 secured to the sides 13 and 14 and contained in vertically extending slots 24 formed in the flanges 21 and 22. Mounted on the horizontally extending portion 20 of the motor platform is an electric motor 25, the armature shaft 26 of which extends through the platform 20 and depends below the same for a short distance. The motor is enclosed and protected from dirt by a motor enclosing housing 27 in the form of a hollow dome like shell provided at its lower edge with outstanding flanges 28 demountably secured by nuts 29 to the motor platform. A rotary disc cutter 30 is demountably secured to the lower end of shaft 26 and secured in position by means of a set screw 31 and holding plate 32 underlapping the hub 33 formed on the cutter. The cutter 30 is in the form of a circular flat steel plate or disc provided with integral grass cutting teeth 34 depending below the plate as particularly shown in Figs. 4 and 7. As shown more particularly in Fig. 5, the teeth 34 are formed by cutting circumferentially spaced apart sets of slots, two of which 35 and 36 extend parallel to each other and are connected at their advanced or clockwise edge by a transverse slit 37. The material outlined by the slits is bent out of the plane of the plate as indicated in Fig. 7 and terminates in a sharp edge 38 the underside 39 of which is disposed in a plane indicated by the lines a—b in Fig. 7 spaced from and parallel to the plane of the plate 30. This disposition of the teeth with the sides 39 opposite the plate exposed permits easy engagement of the teeth for the purpose of sharpening the same initially and for resharpening the same from time to time as the cutting teeth become dulled during use. In the form of the teeth shown in Fig. 7, it decreases in thickness from its jointure at 40 with the plate 30 to the sharpened edge 38.

Where the teeth are positioned inwardly from the periphery 41 of the cutter, there is provided between the teeth and this periphery a protecting ring 42 which tends to prevent accidental contact with the revolving cutting teeth. In the showing in Fig. 7, the teeth 43 are at the peripheral edge 41, or differently expressed, the slit 35 of the showing in Fig. 5 coincides with the peripheral edge but otherwise the construction of the pressed teeth is as previously described for the showing in Fig. 5.

The motor 25 is supplied with electric energy from some suitable source such as the house lighting system by means of a long cable 44 having a connector 45 at one end and with its other end secured to and passed through a boss 46' on the side of the motor housing 27. For the purpose of keeping the end portion of the cable adjacent the lawn mower from becoming entangled with the cutter and its associated parts, this portion is bridged across the roller 17 and is supported in elevated position by being passed through an upstanding post 46 secured to the end of the frame 13 adjacent the handle 47. The cable is also secured to this handle by means of fastening devices 48 and the portion of the cable lying on top of the handle is provided with some suitable form of switch 49 for controlling the motor.

Figure 4:
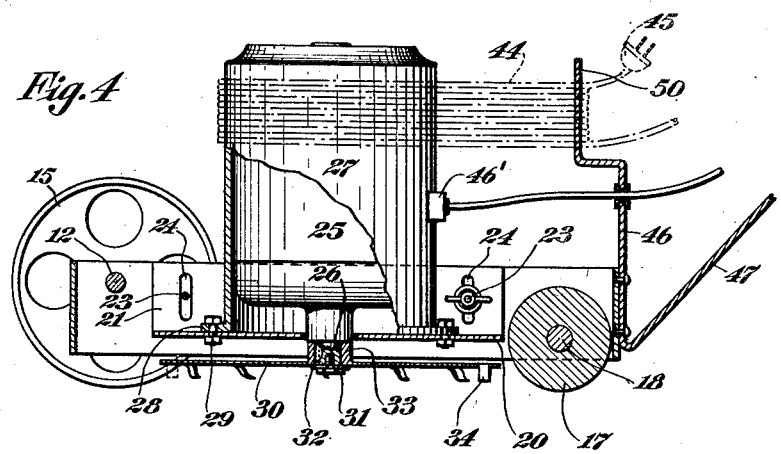
Fig. 4 is a sectional view taken along the vertical medial longitudinal plane of the device and taken on the line 4—4 of Fig. 2 looking in the direction indicated by the arrows.
Figure 5:
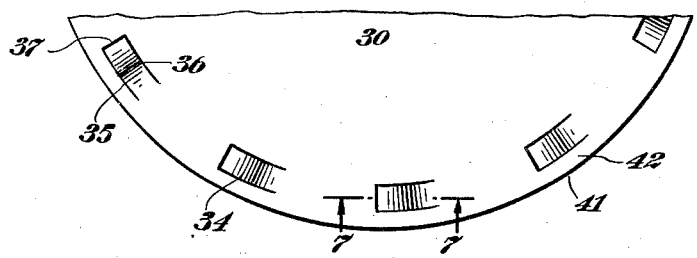
Fig. 5 is a fragmentary view on an enlarged scale of part of the rotary disc cutter forming the grass cutting tool shown in the preceding figures.

The upper end of the post 46 is bent Z-shaped to a shouldered portion 50 about which and about the casing 27 the long cable may be wrapped and disposed neatly in an out-of-the-way position as indicated in Fig. 4.

In operation it will be understood that the position of the cutting tool is adjusted vertically relative to the ground or to the supporting plane defined by the wheels 15, 16 and roller 17, so as to define the position at which the cutter will engage the grass to be cut. When suitably adjusted the motor platform and with it the motor and its associated cutter are secured in position by tightening up the wing nuts 23. With the connector 45 engaging a suitable source of electric power and with the switch 49 in circuit closing position, the mower is simply pushed about the lawn by means of the handle 47. It is intended that the cutter be rotated at high speed and under these conditions circular swaths of grass will be cut evenly and smoothly and the operation is continued until the entire area of lawn has been cut. It is obviously possible with progressive lowering of the motor support to gradually and progressively reduce the height of the grass on the lawn and this can be done without necessity of changing the parts forming the driving connection between the motor and cutter.

The present disclosure features a safety device, it being noted that the cutter is within the downwardly projected outline of the motor platform and that the motor platform is disposed in relatively close position to and above the rotary disc cutter thus protecting the same from accidental contact. This relative position of the cutter and platform is maintained fixed irrespective of any adjustment of the cutter with reference to the wheel supported carriage.

Figure 6:
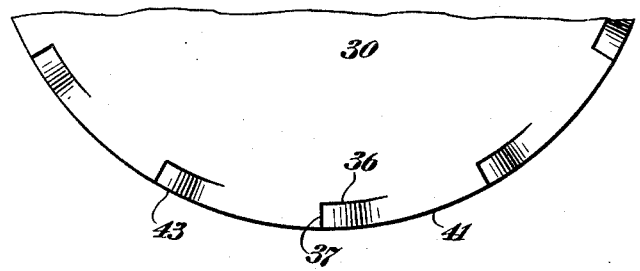
Fig. 6 is a similar view showing a slightly modified form of cutter.

Should it be desired to sharpen the cutter, fastening screw 31 is removed, the cutter as a whole is dropped from the shaft 26 and the faces 39 subjected to a sharpening operation. It is even possible to sharpen the teeth 34 without demounting the cutter from the machine, it simply being necessary to turn the cutter in reverse direction, that is, in a direction anticlockwise in the showing in Figs. 2, 5, and 6, drawing the faces 39 over a suitable grinding or finishing surface to sharpen all of the edges 38.

By means of the device herein illustrated, it is possible to form the carriage 10 of light, thin material and dependence can be made upon the channel shaped pan forming the motor platform for giving rigidity to the frame and to prevent it from buckling out of shape. The cutter adjusting means is exceedingly simple, it being necessary merely to loosen bolts 23, raise or lower the platform and tighten up the bolts to hold the platform in any desired adjusted position. All of the mechanism except the cutter itself is protected within the motor casing and all of the parts are exposed for easy cleaning. It is obviously within the scope of the disclosure to have the motor 25 of the reversible type so that in this case it would be merely necessary to reverse the direction of rotary movement of the motor to cause the teeth to be drawn backwardly across a grinding or polishing surface to sharpen the teeth after which the motor could be reversed in its normal direction of travel to cause the teeth to function in their grass cutting operation.

It is also obviously within the scope of the invention to utilize some other form of prime mover in place of the electric motor and it is suggested that a gasoline motor be carried on the adjustable platform and connected by suitable driving mechanism to the shaft driving the disc cutter.

I claim:

1. In a lawn mower, the combination of a rectangular frame open at top and bottom, a wheel supported axle extending laterally through the frame adjacent one end, a roller contained within the outlines of the frame adjacent the other end, a replaceable unit comprising a motor platform constituting a filler fitted between the opposite sides of the frame to brace the same internally and located between the axle and roller, an electric motor secured to the platform with its armature shaft projecting therefrom vertically downward through the platform, a one piece rotary disc cutter demountably secured to the lower end of the armature shaft and disposed in a horizontal plane beneath the underside of the platform and contained within the downwardly projected outlines of the motor platform whereby the platform overlaps and thus tends to prevent accidental access to the top side of the cutter.

2. In a lawn mower, the combination of a vertically extending power shaft, an electric motor for rotating the shaft, a one-piece disc cutter, means for demountably securing the cutter to the lower end of the shaft for rotation in a horizontal plane, said cutter comprising a flat circular plate having a single circular line of circumferentially spaced sets of slits, each set including a pair of parallel slits and a radially extending slit connecting the parallel slits, with the material bounded by the slits of each set bent out of the plane of the plate and forming integral grass cutting teeth, the free ends of the teeth formed by said radially extending slit extending in a plane parallel to the plane of the plate, the center of the plate provided with a hub and being of solid construction between the hub and circular line of teeth.

3. In a lawn mower, a rotary disc cutter, means for rotating the same in a horizontal plane, means at the center of the cutter for securing the same in vertically adjusted position, said cutter comprising a flat circular plate provided with a circular line of parallel slits with the material of the plate solid between the line of slits and the securing means at the cutter and the material between the slits bent downwardly out of the plane of the plate into an S-shape, gradually decreasing in thickness from its jointure with the plate to a sharpened edge and having the underside of its sharpened edge horizontally disposed and extending parallel to and spaced downwardly from the plate.

4. In a lawn mower, the combination with a wheel supported carriage including a horizontally extending platform, means for mounting the platform to bring the same close to the ground, an electric motor carried by the platform and vertically adjustable therewith, a one-piece disc cutter in the form of a plate operatively connected to be driven by the motor and located beneath the platform, and said disc provided with circumferentially spaced sets of slits with the material bounded by the slits of each set bent downwardly out of the plane of the plate to form grass cutting teeth, said teeth being spaced inwardly from the peripheral edge of the plate and the portion of said edge between the teeth and the periphery forming a protecting ring and said platform projecting outwardly and in overlapping relation beyond said protecting ring.

ROBERT BIGHAM SMITH.